(12) United States Patent
Ono et al.

(10) Patent No.: US 11,548,347 B2
(45) Date of Patent: Jan. 10, 2023

(54) TEMPERATURE ADJUSTMENT CIRCUIT

(71) Applicant: HONDA MOTOR CO., LTD., Tokyo (JP)

(72) Inventors: Hiroyuki Ono, Tokyo (JP); Toru Ogaki, Tokyo (JP); Seiji Isotani, Tokyo (JP); Kazumi Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 17/357,192

(22) Filed: Jun. 24, 2021

(65) Prior Publication Data

US 2021/0402845 A1 Dec. 30, 2021

(30) Foreign Application Priority Data

Jun. 29, 2020 (JP) .............................. JP2020-111177

(51) Int. Cl.
*B60H 1/32* (2006.01)
*B60H 1/00* (2006.01)
*B60H 1/03* (2006.01)

(52) U.S. Cl.
CPC ..... *B60H 1/00278* (2013.01); *B60H 1/00392* (2013.01); *B60H 1/00485* (2013.01); *B60H 1/00885* (2013.01); *B60H 1/034* (2013.01)

(58) Field of Classification Search
CPC ............ B60H 1/00278; B60H 1/00392; B60H 1/00485; B60H 1/00885; B60H 1/034
USPC .......................................................... 62/239
See application file for complete search history.

(56) References Cited

FOREIGN PATENT DOCUMENTS

DE 102017126879 A1 * 12/2018
JP 2020-013726 A 1/2020

* cited by examiner

*Primary Examiner* — Davis D Hwu
(74) *Attorney, Agent, or Firm* — Paratus Law Group, PLLC (57) ABSTRACT

A temperature adjustment circuit for a vehicle includes a first temperature adjustment circuit for vehicle interior air conditioning or heating, a second temperature adjustment circuit that is configured to transfer heat with a battery, a connection path that is configured to connect the first temperature adjustment circuit and the second temperature adjustment circuit to form a connection circuit, and a first valve and a second valve that are configured to switch between an independent state where the first temperature adjustment circuit and the second temperature adjustment circuit are independent and a connection state where the connection circuit is formed.

6 Claims, 8 Drawing Sheets

TEMPERATURE ADJUSTMENT CIRCUIT

CROSS-REFERENCE TO RELATED APPLICATION

The present application claims the benefit of priority of Japanese Patent Application No. 2020-111177, filed on Jun. 29, 2020, the content of which is incorporated herein by reference.

TECHNICAL FIELD

The present invention relates to a temperature adjustment circuit for a vehicle.

BACKGROUND ART

There has been known a temperature adjustment circuit for a vehicle that is capable of heating a battery (for example, JP2020-013726A).

However, since the temperature adjustment circuit disclosed in JP2020-013726A is provided with a heater dedicated to the battery, there is room for improvement in terms of cost.

SUMMARY

The present invention provides a temperature adjustment circuit capable of heating a battery without providing a heater dedicated to the battery.

The present invention includes:
a first temperature adjustment circuit for vehicle interior air conditioning or heating;
a second temperature adjustment circuit that is configured to transfer heat with a battery:
a connection path that is configured to connect the first temperature adjustment circuit and the second temperature adjustment circuit to form a connection circuit:
a first valve and a second valve that are configured to switch between an independent state where the first temperature adjustment circuit and the second temperature adjustment circuit are independent and a connection state where the connection circuit is formed:
a first pump that is provided in the first temperature adjustment circuit;
a second pump that is provided in the second temperature adjustment circuit; and
a heater that is provided in the first temperature adjustment circuit and is configured to heat a first medium flowing through the first temperature adjustment circuit in the independent state and to heat the first medium flowing through the connection circuit in the connection state.

According to the present invention, it is possible to heat the battery without providing a heater dedicated to the battery.

DESCRIPTION OF EMBODIMENTS

An embodiment of the present invention will be described below with reference to FIGS. 1 to 8.

[Temperature Adjustment Circuit]

Figure 1:
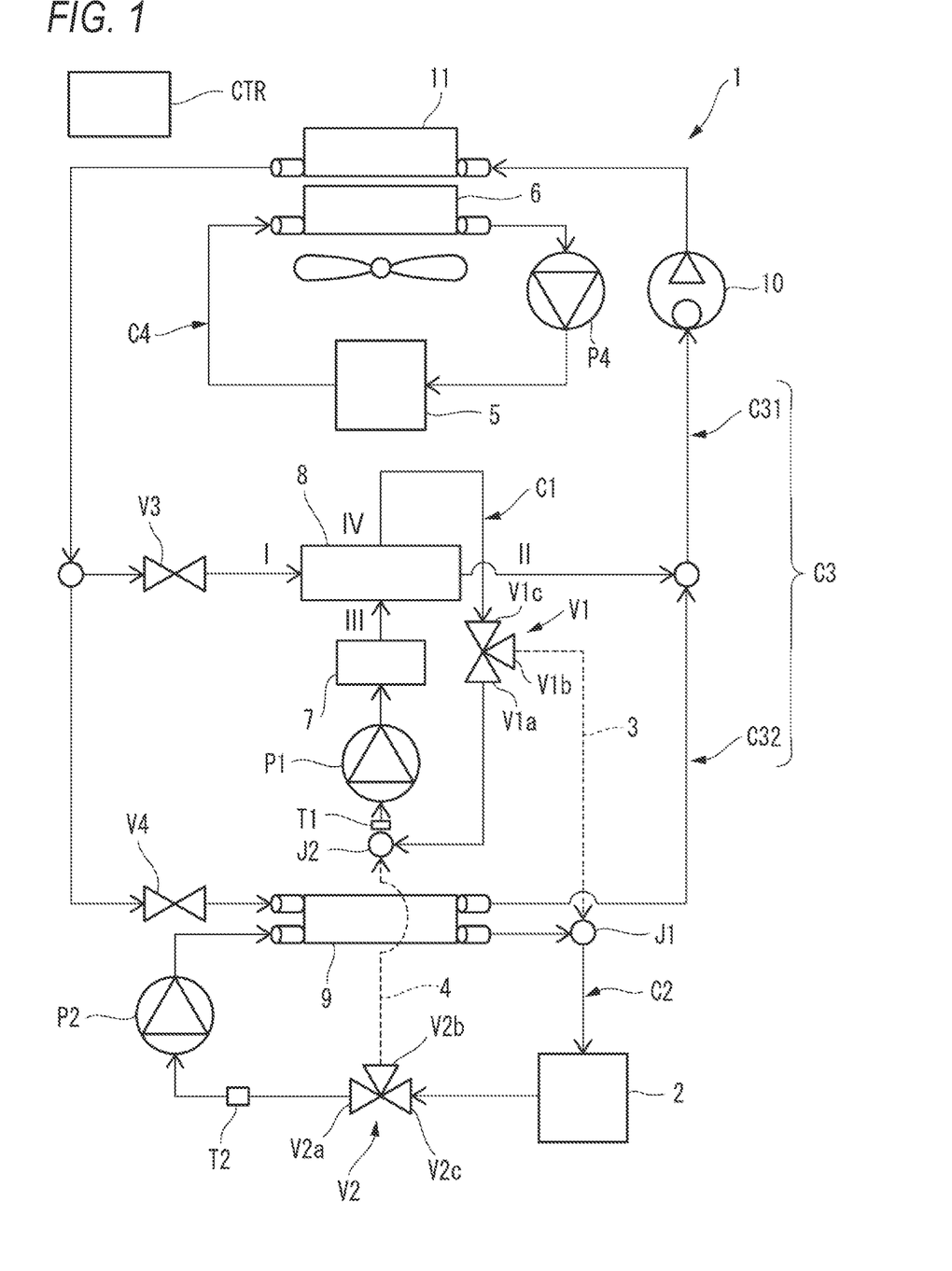
FIG. 1 is a circuit diagram showing a configuration of a temperature adjustment circuit according to an embodiment of the present invention.
Figure 2:
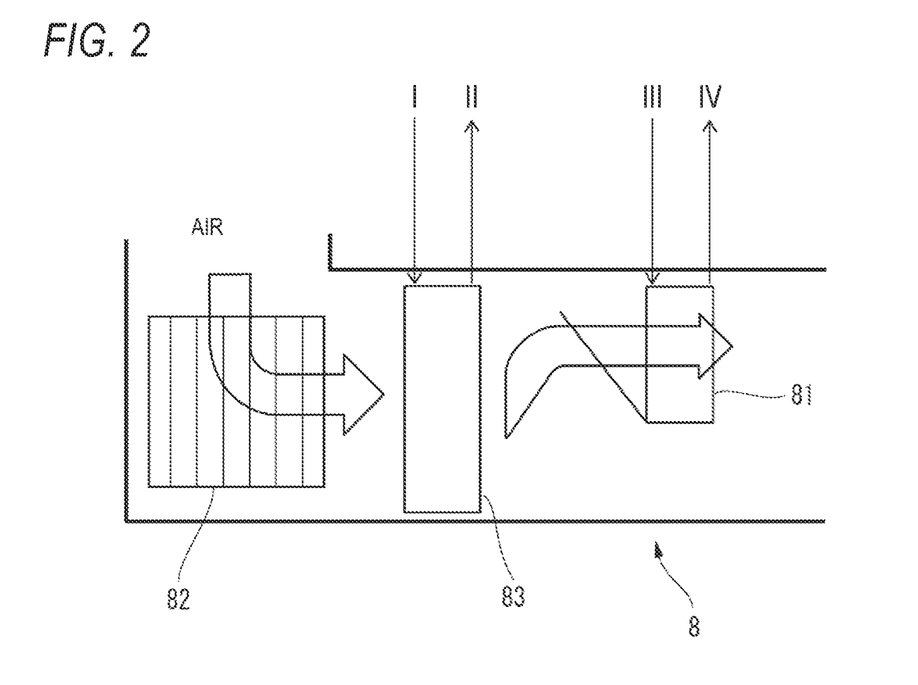
FIG. 2 is a schematic diagram showing a configuration of an air-conditioning unit provided in the temperature adjustment circuit in FIG. 1.
Figure 3:
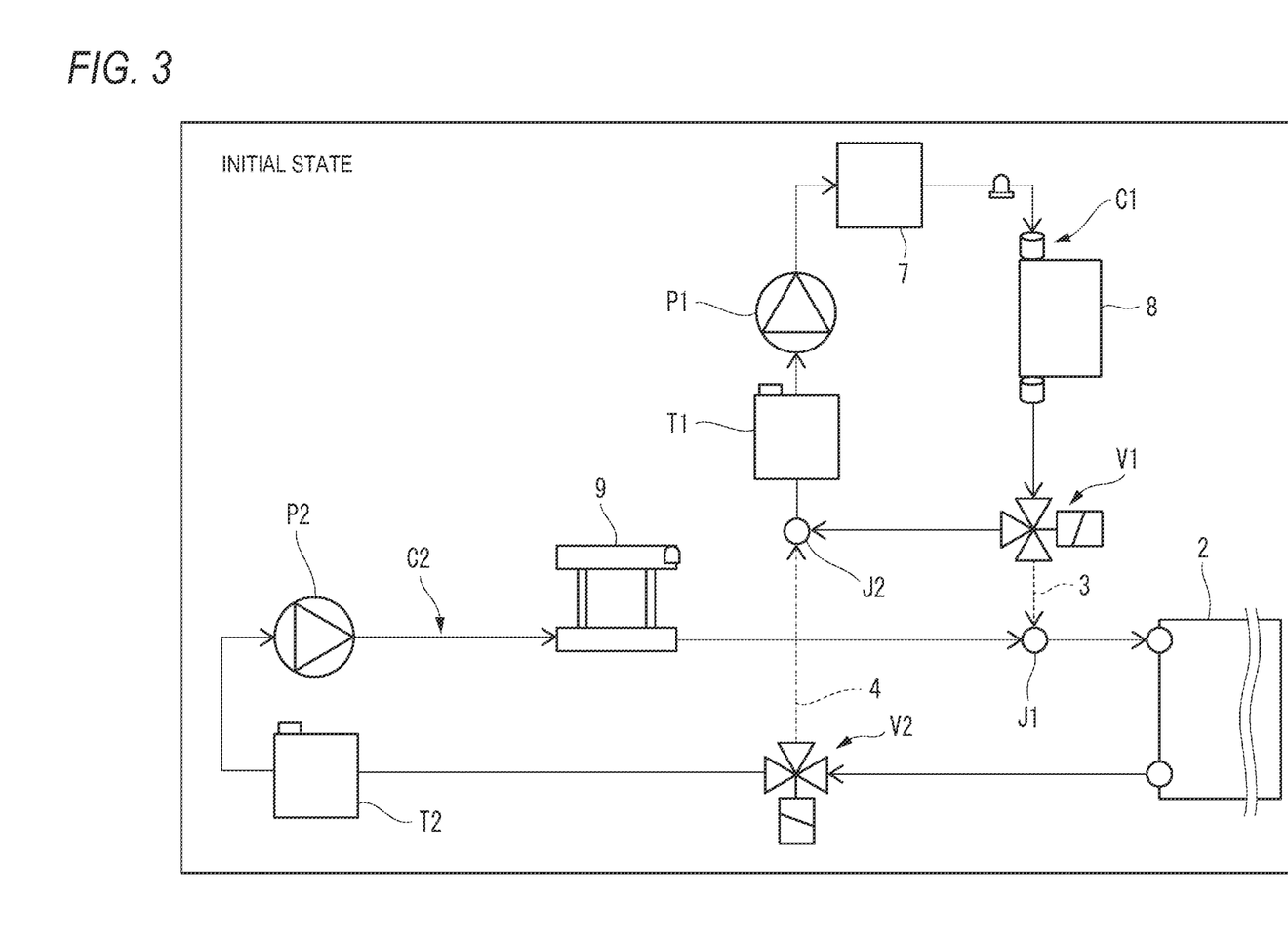
FIG. 3 is an explanatory diagram showing an initial state of a first temperature adjustment circuit and a second temperature adjustment circuit that are provided in the temperature adjustment circuit in FIG. 1.

As shown in FIG. 1, a temperature adjustment circuit 1 for an electric vehicle includes a first temperature adjustment circuit C1 for vehicle interior heating, a second temperature adjustment circuit C2 that is configured to transfer heat with a battery 2, a third temperature adjustment circuit C3 for vehicle interior air conditioning, a first connection path 3 and a second connection path 4 that are configured to connect the first temperature adjustment circuit C1 and the second temperature adjustment circuit C2 to form a connection circuit CC (see FIG. 5), a first valve V1 and a second valve V2 that are configured to switch between an independent state where the first temperature adjustment circuit C1 and the second temperature adjustment circuit C2 are independent and a connection state where the connection circuit CC is formed, a fourth temperature adjustment circuit C4 for drive unit cooling, and a control device CTR configured to control the temperature adjustment circuits C1 to C4, the valves V1 and V2, and the like. Although the fourth temperature adjustment circuit C4 is configured with a fourth pump P4, a drive unit 5 (including a motor, an inverter, and the like), and a radiator 6 disposed in a circuit through which a liquid refrigerant circulates, since less relevant to the present invention, a detailed description thereof will be omitted.

[First Temperature Adjustment Circuit]

The first temperature adjustment circuit C1 includes a first pump P1 that is configured to circulate a first medium in the circuit, a heater 7 that is provided downstream of the first pump P1 and is configured to heat the first medium, an air-conditioning unit 8 (heating ventilation and air conditioning) that is provided downstream of the heater 7 and is capable of transferring heat between a first medium flowing through the first temperature adjustment circuit C1 and air and between a second medium flowing through the third temperature adjustment circuit C3 and air, a first valve V1 that is provided downstream of the air-conditioning unit 8, and a first storage portion T1 that is provided downstream of the first valve V1 and is configured to store the first medium. The first medium is a liquid medium such as water, radiator fluid, and coolant, and the second medium is a liquid medium such as a refrigerant that vaporizes in a low-pressure environment and liquefies in a high-pressure environment. The heater 7 is, for example, an electric heater (an electric coolant heater).

Figure 4:
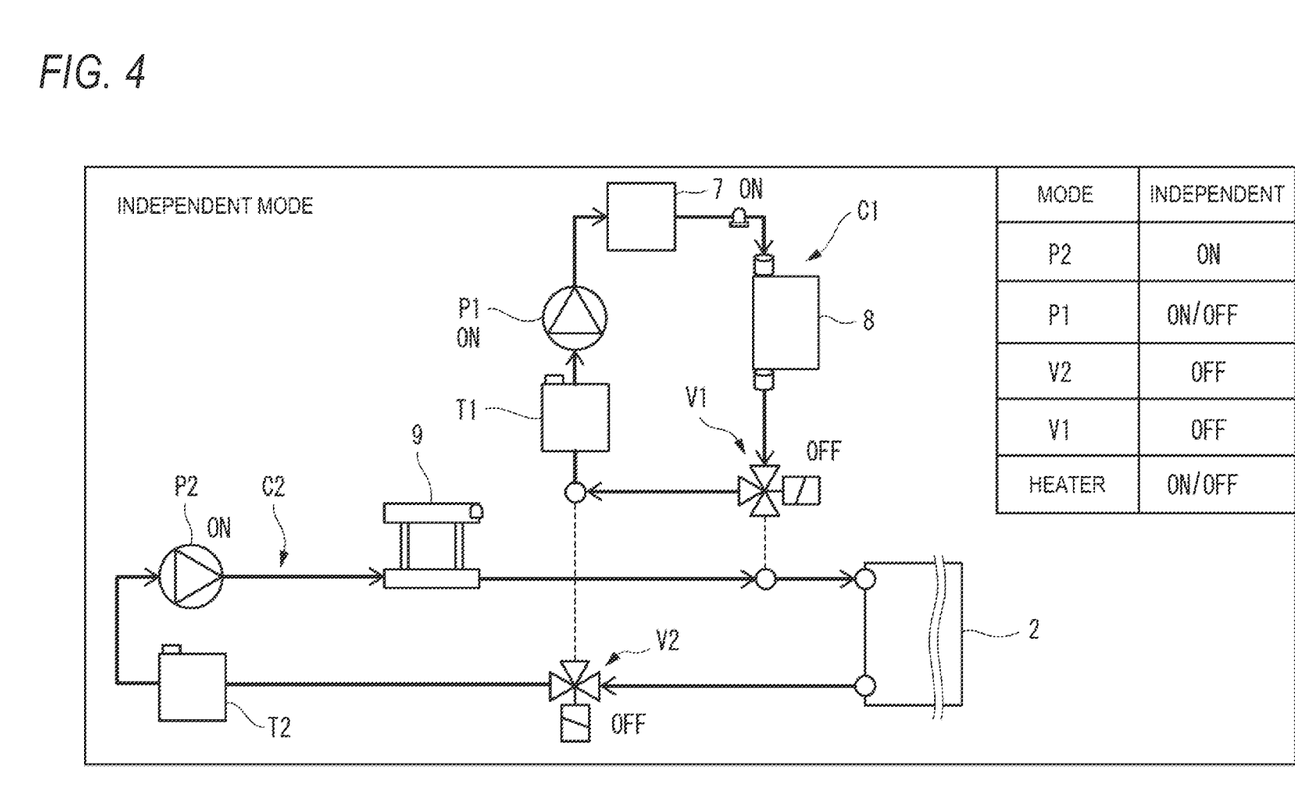
FIG. 4 is an explanatory diagram showing an independent mode of the first temperature adjustment circuit and the second temperature adjustment circuit that are provided in the temperature adjustment circuit in FIG. 1.

As shown in FIG. 4, in the independent mode, where the first valve V1 and the second valve V2 are OFF and the first temperature adjustment circuit C1 is not connected to the second temperature adjustment circuit C2, the first medium discharged from the first pump P1 circulates in the first temperature adjustment circuit C1 through the heater 7, the air-conditioning unit 8, the first valve V1, and the first storage portion T1 in this order. Accordingly, the first medium heated by the heater 7 transfers heat with air on a heater core 81 (see FIG. 2) in the air-conditioning unit 8, and the air heated by the heat transfer is supplied to a vehicle interior by a fan 82, so that the vehicle interior is appropriately heated. Although the vehicle interior is being heated in FIG. 4, when the vehicle interior is not being heated, the first pump P1 and the heater 7 are not driven (OFF).

[Second Temperature Adjustment Circuit]

The second temperature adjustment circuit C2 includes a second pump P2 that is configured to circulate the first medium in the circuit, a chiller 9 that is provided downstream of the second pump P2 and is configured to transfer heat between the second medium flowing through the third temperature adjustment circuit C3 and the first medium, the battery 2 that is provided downstream of the chiller 9, a second valve V2 that is provided downstream of the battery 2, and a second storage portion T2 that is provided downstream of the second valve V2 and is configured to store the first medium.

As shown in FIG. 4, in the independent mode, where the first valve V1 and the second valve V2 are OFF and the second temperature adjustment circuit C2 is not connected to the first temperature adjustment circuit C1, the first medium discharged from the second pump P2 circulates in the second temperature adjustment circuit C2 through the chiller 9, the battery 2, the second valve V2, and the second storage portion T2 in this order. Accordingly, the first medium cooled by the chiller 9 transfers heat with the battery 2, so that the battery 2 is appropriately cooled.

[Third Temperature Adjustment Circuit]

The third temperature adjustment circuit C3 includes a main flow path C31 in which a compressor 10, a condenser 11, and the air-conditioning unit 8 are disposed along a flow direction of the second medium, a branch flow path C32 that branches from the main flow path C31 and is connected to the chiller 9, a third valve V3 that is provided in the main flow path C31 and is capable of shutting off an inflow of the second medium into the air-conditioning unit 8, and a fourth valve V4 that is provided in the branch flow path C32 and is capable of shutting off an inflow of the second medium into the chiller 9. Although not illustrated, thermal expansion valves are provided between the third valve V3 and the air-conditioning unit 8 and between the fourth valve V4 and the chiller 9, so that the second medium is vaporized. The third valve V3 and the fourth valve V4 are, for example, electrically-actuated valves capable of switching electrically between ON in which the inflow of the second medium is allowed and OFF in which the inflow of the second medium is shut off. The third valve V3 and the fourth valve V4 may be a normally closed valve or a normally open valve.

In a state in which the third valve V3 and the fourth valve V4 are ON and the inflow of the second medium into the air-conditioning unit 8 and the chiller 9 is allowed, the second medium is supplied from the condenser 11 to the air-conditioning unit 8 and the chiller 9 in the third temperature adjustment circuit C3. The second medium supplied to the air-conditioning unit 8 transfers heat with air on an evaporator 83 (see FIG. 2) in the air-conditioning unit 8, and the air cooled by the heat transfer is supplied to the vehicle interior by the fan 82, so that the vehicle interior is appropriately cooled. The second medium supplied to the chiller 9 transfers heat with the first medium on the chiller 9, and the first medium cooled with the heat transfer is supplied to the battery 2, so that the battery 2 is appropriately cooled. The third valve V3 is turned off except when the vehicle interior is being cooled and the fourth valve V4 is turned off except when the battery is being cooled, so that an unnecessary inflow of the second medium into the air-conditioning unit 8 and the chiller 9 is prevented to improve efficiency of the third temperature adjustment circuit C3. The second medium cools the air or the first medium in the air-conditioning unit 8 or the chiller 9 with heat of vaporization when vaporized in an expansion valve (not illustrated), and a vaporized liquid medium is returned to a liquid phase via the compressor 10 and the condenser 11.

[First Valve and Second Valve]

The first valve V1 and the second valve V2 are, for example, an electrically-actuated three-way valve capable of switching two outflow ports electrically. A first outflow port V1a of the first valve V1 is connected to a flow path connected to the first storage portion T1 of the first temperature adjustment circuit C1, and a second outflow port V1b of the first valve V1 is connected to the first connection path 3. When the first valve V1 is OFF, the first outflow port V1a is connected to an inflow port V1c (the second outflow port V1b is shut off), and when the first valve V1 is ON, the second outflow port V1b is connected to the inflow port V1c (the first outflow port V1a is shut off).

A first outflow port V2a of the second valve V2 is connected to a flow path connected to the second storage portion T2 of the second temperature adjustment circuit C2, and a second outflow port V2b of the second valve V2 is connected to the second connection path 4. When the second valve V2 is OFF, the first outflow port V2a is connected to an inflow port V2c (the second outflow port V2b is shut off), and when the second valve V2 is ON, the second outflow port V2b is connected to the inflow port V2c (the first outflow port V2a is shut off).

[First Connection Path and Second Connection Path]

One end side of the first connection path 3 is connected to the second outflow port V1b of the first valve V1, and the other end side is connected to a first connection portion J1 of the second temperature adjustment circuit C2. The first connection portion J1 is provided downstream of the chiller 9 in the second temperature adjustment circuit C2 and upstream of the battery 2. One end side of the second connection path 4 is connected to the second outflow port V2b of the second valve V2, and the other end side is connected to a second connection portion J2 of the first temperature adjustment circuit C1. The second connection portion J2 is provided downstream of the first valve V1 in the first temperature adjustment circuit C1 and upstream of the first storage portion T1.

[Connection Circuit]

Figure 5:
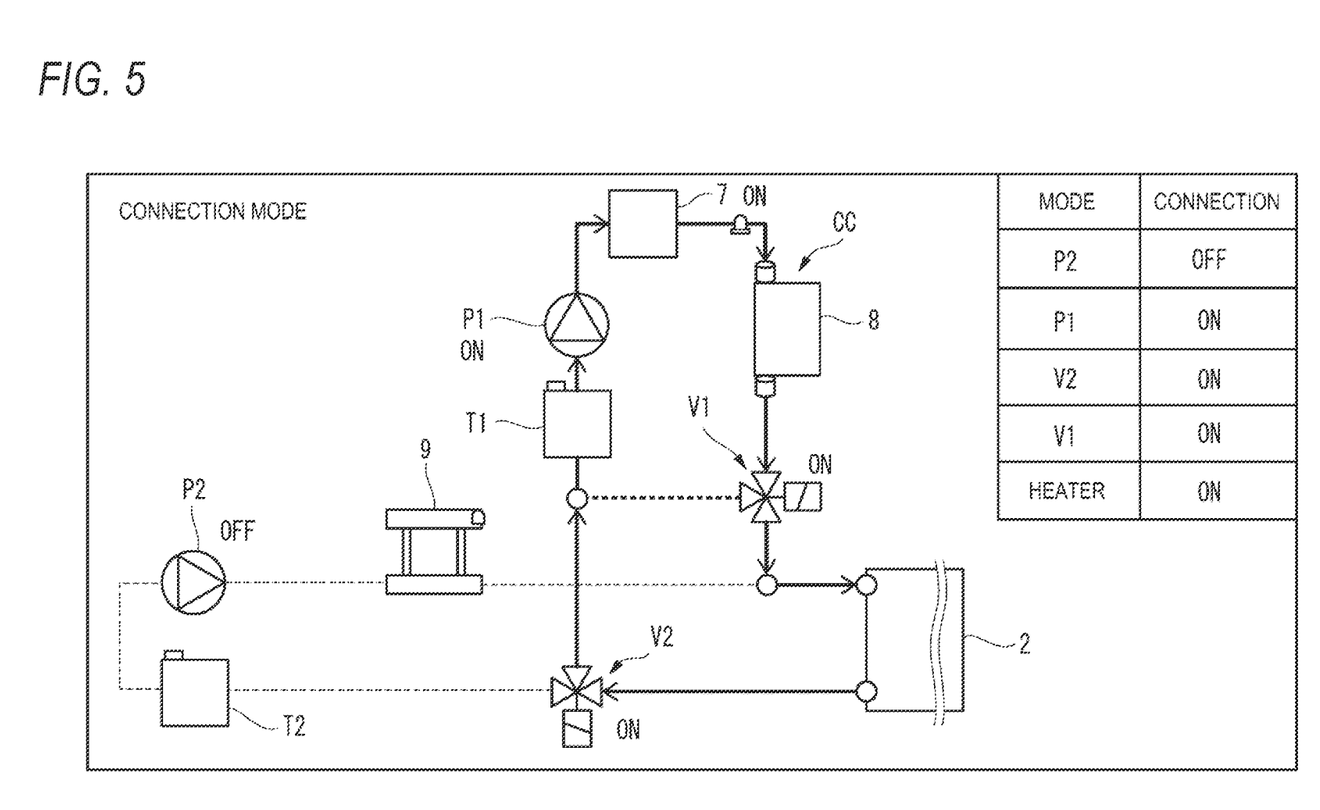
FIG. 5 is an explanatory diagram showing a connection mode of the first temperature adjustment circuit and the second temperature adjustment circuit that are provided in the temperature adjustment circuit in FIG. 1.

As shown in FIG. 5, the connection circuit CC is formed by turning on the first valve V1 and the second valve V2 and connecting the first temperature adjustment circuit C1 and the second temperature adjustment circuit C2 via the first connection path 3 and the second connection path 4. The connection circuit CC includes the first pump P1 that is configured to circulate the first medium in the circuit, the heater 7 that is provided downstream of the first pump P1, the air-conditioning unit 8 that is provided downstream of the heater 7, the first valve V1 that is provided downstream of the air-conditioning unit 8, the battery 2 that is provided downstream of the first valve V1, the second valve V2 that is provided downstream of the battery 2, and the first storage portion T1 that is provided downstream of the second valve V2.

In the connection mode, where the first pump P1 is ON, the second pump P2 is OFF, the first valve V1 and the second valve V2 are ON, and the heater 7 is ON, the first medium discharged from the first pump P1 circulates in the connection circuit CC through the heater 7, the air-conditioning unit 8, the first valve V1, the battery 2, the second valve V2, and the first storage portion T1 in this order. Accordingly, the first medium heated by the heater 7 transfers heat with air on the heater core 81 (see FIG. 2) in the air-conditioning unit 8, and the air heated with the heat transfer is supplied to the vehicle interior by the fan 82 (see FIG. 2), so that the vehicle interior is appropriately heated. Since the first medium flowing out of the air-conditioning unit 8, which is to flow into the battery 2, has a higher temperature than a temperature of the battery that requires heating, the first medium transfers heat with the battery 2, and thereby the battery 2 is appropriately heated. Accordingly, by sharing the heater 7 for vehicle interior heating, it is possible to heat the battery 2 without providing a heater dedicated to the battery.

[Control Device]

When the mode is switched, the control device CTR turns on or off the first valve V1 and the second valve V2. At this time, since the first valve V1 and the second valve V2 have an individual difference, strictly speaking, the first valve V1 and the second valve V2 may not be turned on or off at the same time. At a time of switching from the independent mode to the connection mode, patterns 1 to 6 described below may emerge.

Figure 6:
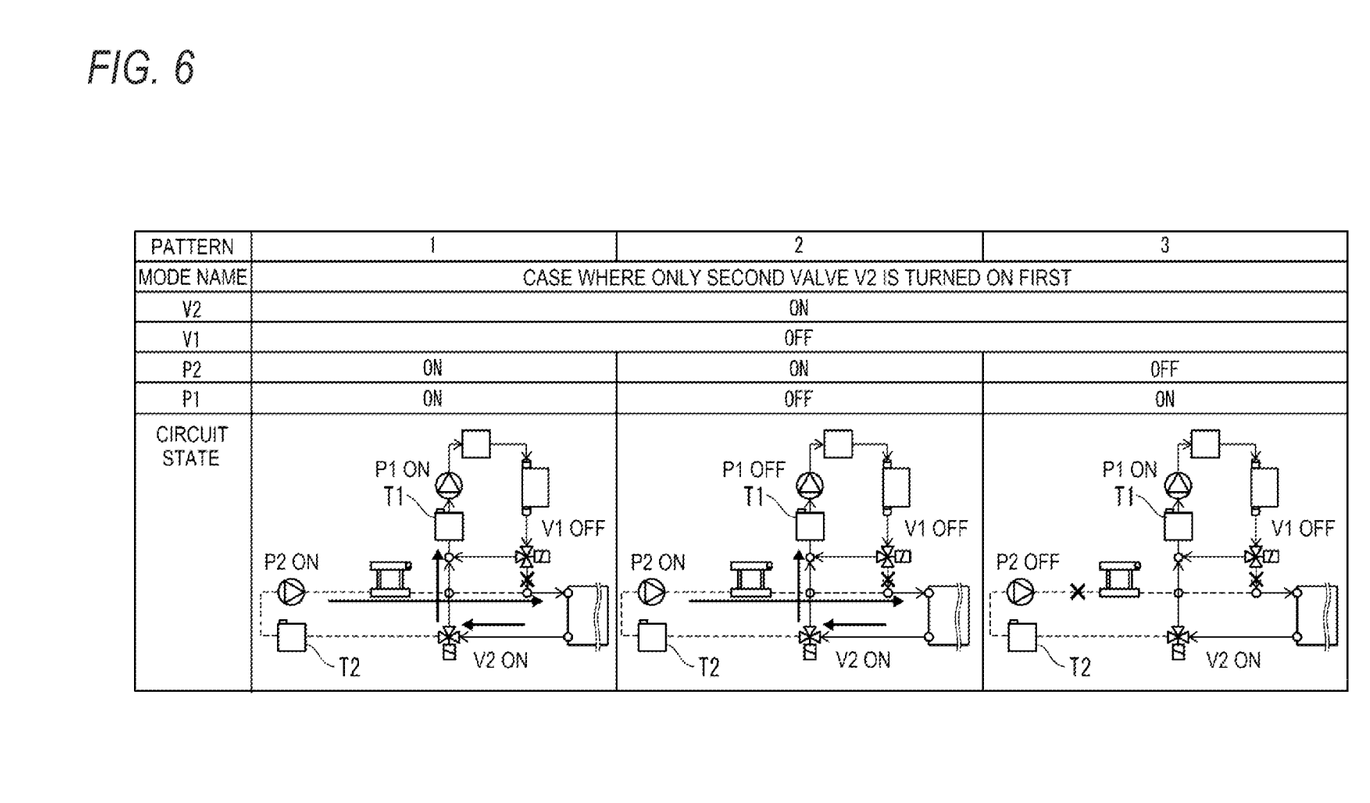
FIG. 6 is an explanatory diagram showing a flow of a liquid medium in a case in which a second valve is turned on before a first valve when the first temperature adjustment circuit and the second temperature adjustment circuit that are provided in the temperature adjustment circuit in FIG. 1 switches from the independent mode to the connection mode.

For example, as shown in the pattern 1 in FIG. 6, when the first valve V1 and the second valve V2 are switched from OFF to ON as switching from an independent mode, where the first pump P1 and the second pump P2 are ON, to the connection mode, if the second valve V2 is turned on before the first valve V1, the first medium may move from the second storage portion T2 to the first storage portion T1, so that the first storage portion T1 may overflow.

As shown in the pattern 2 in FIG. 6, when the first valve V1 and the second valve V2 are switched from OFF to ON as switching from an independent mode, where the first pump P1 is OFF and the second pump P2 is ON, to the connection mode, if the second valve V2 is turned on before the first valve V1, the first medium may move from the second storage portion T2 to the first storage portion T1, so that the first storage portion T1 may overflow.

As shown in the pattern 3 in FIG. 6, when the first valve V1 and the second valve V2 are switched from OFF to ON as switching from an independent mode, where the first pump P1 is ON and the second pump P2 is OFF, to the connection mode, there is no problem since the first medium does not move from the second storage portion T2 to the first storage portion T1 even if the second valve V2 is turned on before the first valve V1.

Figure 7:
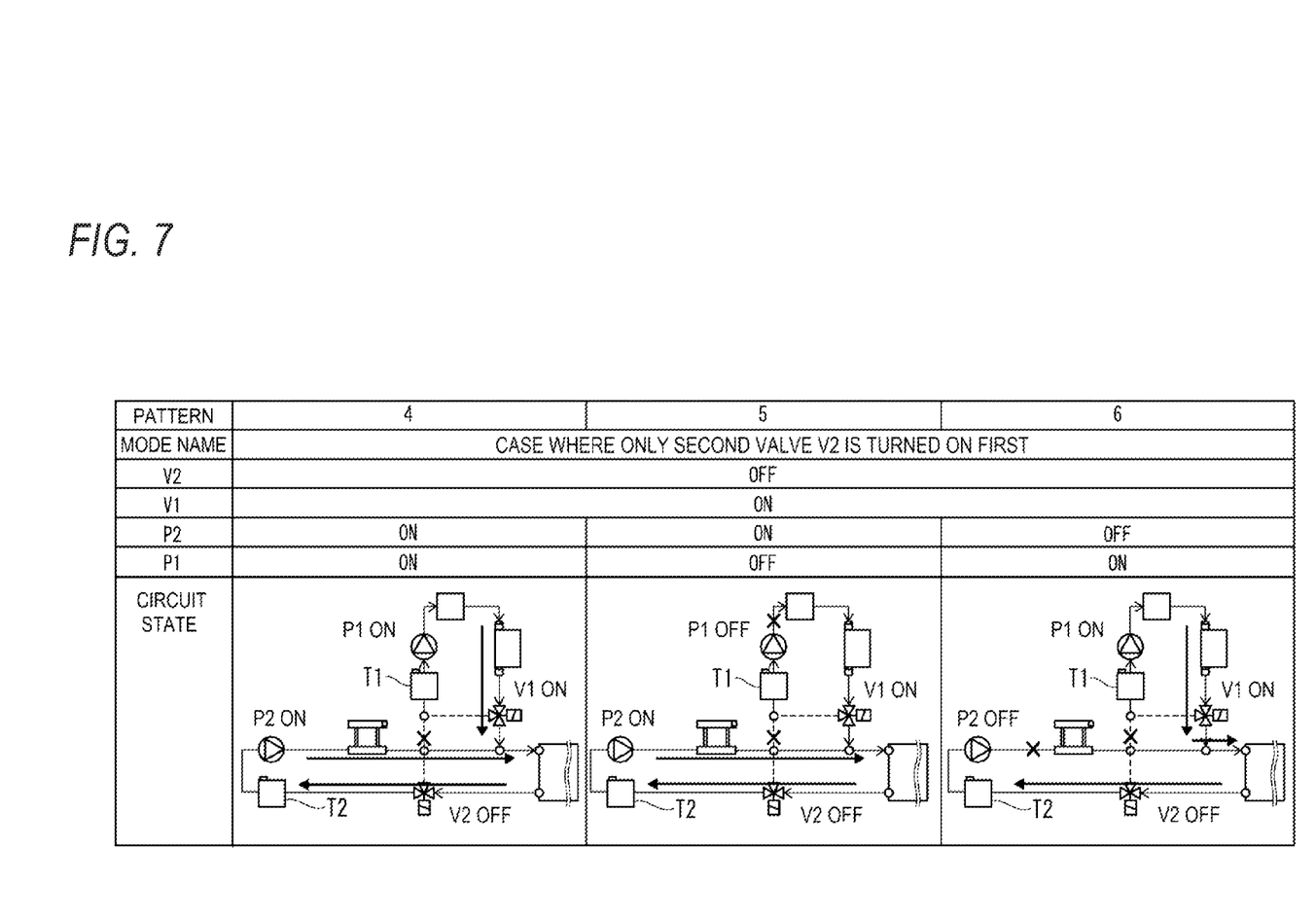
FIG. 7 is an explanatory diagram showing a flow of a liquid medium in a case in which the first valve is turned on before the second valve when the first temperature adjustment circuit and the second temperature adjustment circuit that are provided in the temperature adjustment circuit in FIG. 1 switches from the independent mode to the connection mode.

On the other hand, as shown in the pattern 4 in FIG. 7, when the first valve V1 and the second valve V2 are switched from OFF to ON as switching from the independent mode, where the first pump P1 and the second pump P2 are ON, to the connection mode, if the first valve V1 is turned on before the second valve V2, the first medium may move from the first storage portion T1 to the second storage portion T2, so that the second storage portion T2 may overflow.

As shown in the pattern 5 in FIG. 7, when the first valve V1 and the second valve V2 are switched from OFF to ON as switching from the independent mode, where the first pump P1 is OFF and the second pump P2 is ON, to the connection mode, there is no problem since the first medium does not move from the first storage portion T1 to the second storage portion T2 even if the first valve V1 is turned on before the second valve V2.

As shown in the pattern 6 in FIG. 7, when the first valve V1 and the second valve V2 are switched from OFF to ON as switching from the independent mode, where the first pump P1 is ON and the second pump P2 is OFF, to the connection mode, if the first valve V1 is turned on before the second valve V2, the first medium may move from the first storage portion T1 to the second storage portion T2, so that the second storage portion T2 may overflow.

In order to solve the above-described problem, the control device CTR executes pump rotation restriction control such that a rotation speed of the first pump P1 and the second pump P2 does not exceed a predetermined value when the first valve V1 and the second valve V2 are switched, or pump stop control such that the first pump P1 and the second pump P2 are stopped (or kept stopped) when the first valve V1 and the valve V2 are switched. According to the pump rotation restriction control or the pump stop control, when the first valve V1 and the second valve V2 are switched, movement between the storage portions T1, T2 of the first medium is prevented, so that a probability that the storage portions T1 or T2 overflows with the first medium can be reduced.

[First Storage Portion and Second Storage Portion]

The first storage portion T1 includes a releasing portion (not illustrated) that is configured to release an internal pressure when the internal pressure exceeds a first threshold value, and the second storage portion T2 includes a releasing portion that is (not illustrated) configured to release an internal pressure when the internal pressure exceeds a second threshold value. The first threshold value is preferably set to be lower than the second threshold value.

Figure 8:
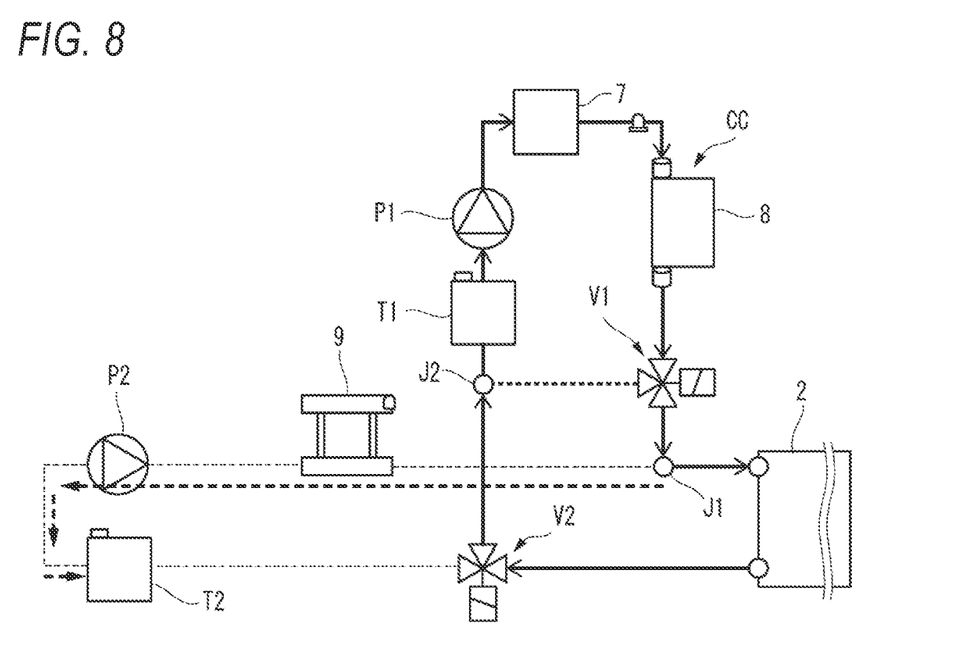
FIG. 8 is an explanatory diagram showing an inflow of a liquid medium into a second storage portion in the connection mode of the first temperature adjustment circuit and the second temperature adjustment circuit that are provided in the temperature adjustment circuit in FIG. 1.

In the independent mode (a vehicle interior heating and battery cooling mode) shown in FIG. 4, the internal pressure of the second storage portion T2 decreases as a temperature of the first medium in the second temperature adjustment circuit C2 decreases, and the internal pressure of the first storage portion T1 increases as a temperature of the first medium in the first temperature adjustment circuit C1 increases. When the mode is switched from the independent mode (the vehicle interior heating and battery cooling mode) to the connection mode (a vehicle interior heating and battery heating mode), as shown in FIG. 8, a situation occurs in which the first medium flows into the second storage portion T2 having a relatively low pressure. In this situation, when both the first threshold value and the second threshold value are set to a high value, the first medium flows into the second storage portion T2 until the internal pressures of the first storage portion T1 and the second storage portion T2 get equal, so that the internal pressures of the first storage portion T1 and the second storage portion T2 fairly fluctuate and are not stable. On the other hand, when both the first threshold value and the second threshold value are set to a low value, the first medium may flow into the second storage portion T2, so that the second storage portion T2 may overflow with the first medium.

In the present embodiment, the first threshold value is set to be lower than the second threshold value. Therefore, in the situation shown in FIG. 8, a change in the internal pressures of the first storage portion T1 and the second storage portion T2 can be reduced, and the internal pressure of the second storage portion T2 is less likely to be released even if the first medium flows into the second storage portion T2. As a result, it is possible to prevent the second storage portion T2 from overflowing with the first medium while keeping the pressures of the storage portions T1 and T2 within a desired range.

The above-described embodiments can be appropriately modified, improved, or the like.

For example, in the above-described embodiment, the drive unit 5 (including a motor, an inverter, and the like) is cooled by the fourth temperature adjustment circuit C4. However, the inverter of the drive unit 5 may be cooled by the second temperature adjustment circuit C2, or the motor and the inverter of the drive unit 5 may be cooled by the second temperature adjustment circuit C2.

In the present specification, at least the following matters are described. Although corresponding components or the like in the above embodiment are shown in parentheses, the present disclosure is not limited thereto.

(1) A temperature adjustment circuit (the temperature adjustment circuit 1) for a vehicle including:
a first temperature adjustment circuit (the first temperature adjustment circuit C1) for vehicle interior air conditioning or heating;
a second temperature adjustment circuit (the second temperature adjustment circuit C2) that is configured to transfer heat with a battery (the battery 2);
a connection path (the first connection path 3 and the second connection path 4) that is configured to connect the first temperature adjustment circuit and the second temperature adjustment circuit to form a connection circuit (the connection circuit CC);
a first valve (the first valve V1) and a second valve (the second valve V2) that are configured to switch between an independent state where the first temperature adjustment circuit and the second temperature adjustment circuit are independent and a connection state where the connection circuit is formed;
a first pump (the first pump P1) that is provided in the first temperature adjustment circuit;
a second pump (the second pump P2) that is provided in the second temperature adjustment circuit; and
a heater (the heater 7) that is provided in the first temperature adjustment circuit and is configured to heat a first medium flowing through the first temperature adjustment circuit in the independent state and to heat the first medium flowing through the connection circuit in the connection state.

According to (1), even if a heater dedicated to the battery is not provided, the vehicle interior can be heated by one common heater, and the battery can be heated. In other words, the battery can be heated by a heater for vehicle interior air conditioning or heating.

(2) The temperature adjustment circuit according to (1), in which the first temperature adjustment circuit is a circuit for vehicle interior heating,
in which the temperature adjustment circuit further includes a third temperature adjustment circuit (the third temperature adjustment circuit C3) for vehicle interior air conditioning, and
in which the first temperature adjustment circuit and the third temperature adjustment circuit are connected to an air-conditioning unit (the air-conditioning unit 8) including a first heat exchanging unit (the heater core 81) configured to transfer heat between the first medium flowing through the first temperature adjustment circuit and air and a second heat exchanging unit (the evaporator 83) configured to transfer heat between a second medium flowing through the third temperature adjustment circuit and air.

According to (2), it is possible to heat and cool the vehicle interior and heat the battery.

(3) The temperature adjustment circuit according to (2), in which the second temperature adjustment circuit and the third temperature adjustment circuit are connected to a third heat exchanging unit (the chiller 9) configured to transfer heat between the second medium flowing through the third temperature adjustment circuit and the first medium flowing through the second temperature adjustment circuit.

According to (3), the battery can be cooled with the heat transfer with the second medium flowing through the third temperature adjustment circuit. The third temperature adjustment circuit is configured to cool the vehicle interior.

(4) The temperature adjustment circuit according to (3), in which the third temperature adjustment circuit includes:
a main flow path (the main flow path C31) that connects the air-conditioning unit and a condenser (the condenser 11);
a branch flow path (the branch flow path C32) that branches from the main flow path and is connected to the third heat exchanging unit;
a third valve (the third valve V3) that is provided in the main flow path and is configured to shut off an inflow of the second medium into the air-conditioning unit; and
a fourth valve (the fourth valve V4) that is provided in the branch flow path and is configured to shut off an inflow of the second medium into the third heat exchanging unit.

According to (4), the efficiency of the third temperature adjustment circuit can be improved by controlling the inflow into the air-conditioning unit and the third heat exchanging unit.

(5) The temperature adjustment circuit according to (1), in which the first temperature adjustment circuit is provided with a first storage portion (the first storage portion T1),
in which the second temperature adjustment circuit is provided with a second storage portion (the second storage portion T2),
in which the temperature adjustment circuit further includes a control device (the control device CTR) that is configured to control the first pump, the second pump, the first valve, and the second valve, and
in which the control device is configured to execute control such that a rotation speed of the first pump and the second pump does not exceed a predetermined value when the first valve and the second valve are switched.

According to (5), when the first valve and the second valve are switched, it can be prevented from the first storage portion and the second storage portion from overflowing with a liquid medium.

(6) The temperature adjustment circuit according to (5), in which the control device is configured to stop the first pump and the second pump or maintain a stop when the first valve and the second valve are switched.

According to (6), when the first valve and the second valve are switched, it can be further prevented from the first storage portion and the second storage portion from overflowing with a liquid medium.

(7) The temperature adjustment circuit according to (5),
in which the first storage portion includes a releasing portion configured to release an internal pressure when the internal pressure exceeds a first threshold value,
in which the second storage portion includes a releasing portion configured to release an internal pressure when the internal pressure exceeds a second threshold value, and
in which the first threshold value is lower than the second threshold value.

According to (7), it is possible to keep internal pressures of the two storage portions within a desired range, and to prevent the first storage portion and the second storage portion from overflowing with the first medium due to fluctuations in the internal pressures.

What is claimed is:

1. A temperature adjustment circuit for a vehicle comprising:
   a first temperature adjustment circuit for vehicle interior air conditioning or heating;
   a second temperature adjustment circuit that is configured to transfer heat with a battery;
   a connection path that is configured to connect the first temperature adjustment circuit and the second temperature adjustment circuit to form a connection circuit;
   a first valve and a second valve that are configured to switch between an independent state where the first temperature adjustment circuit and the second temperature adjustment circuit are independent and a connection state where the connection circuit is formed;
   a first pump that is provided in the first temperature adjustment circuit;
   a second pump that is provided in the second temperature adjustment circuit; and
   a heater that is provided in the first temperature adjustment circuit and is configured to heat a first medium flowing through the first temperature adjustment circuit in the independent state and to heat the first medium flowing through the connection circuit in the connection state,
   wherein the first temperature adjustment circuit is a circuit for vehicle interior heating,
   wherein the temperature adjustment circuit further includes a third temperature adjustment circuit for vehicle interior air conditioning, and
   wherein the first temperature adjustment circuit and the third temperature adjustment circuit are connected to an air-conditioning unit including a first heat exchanging unit configured to transfer heat between the first medium flowing through the first temperature adjustment circuit and air and a second heat exchanging unit configured to transfer heat between a second medium flowing through the third temperature adjustment circuit and air.

2. The temperature adjustment circuit according to claim 1,
   wherein the second temperature adjustment circuit and the third temperature adjustment circuit are connected to a third heat exchanging unit configured to transfer heat between the second medium flowing through the third temperature adjustment circuit and the first medium flowing through the second temperature adjustment circuit.

3. The temperature adjustment circuit according to claim 2, wherein the third temperature adjustment circuit includes:
   a main flow path that connects the air-conditioning unit and a condenser;
   a branch flow path that branches from the main flow path and is connected to the third heat exchanging unit;
   a third valve that is provided in the main flow path and is configured to shut off an inflow of the second medium into the air-conditioning unit; and
   a fourth valve that is provided in the branch flow path and is configured to shut off an inflow of the second medium into the third heat exchanging unit.

4. The temperature adjustment circuit according to claim 1,
   wherein the first temperature adjustment circuit is provided with a first storage portion,
   wherein the second temperature adjustment circuit is provided with a second storage portion,
   wherein the temperature adjustment circuit further includes a control device that is configured to control the first pump, the second pump, the first valve, and the second valve, and
   wherein the control device is configured to execute control such that a rotation speed of the first pump and the second pump does not exceed a predetermined value when the first valve and the second valve are switched.

5. The temperature adjustment circuit according to claim 4,
   wherein the control device is configured to stop the first pump and the second pump or maintain a stop when the first valve and the second valve are switched.

6. The temperature adjustment circuit according to claim 4,
   wherein the first storage portion includes a releasing portion configured to release an internal pressure when the internal pressure exceeds a first threshold value,
   wherein the second storage portion includes a releasing portion configured to release an internal pressure when the internal pressure exceeds a second threshold value, and
   wherein the first threshold value is lower than the second threshold value.

* * * * *